United States Patent
Motegi et al.

(10) Patent No.: US 7,394,785 B2
(45) Date of Patent: Jul. 1, 2008

(54) MOBILE COMMUNICATION SYSTEM, RADIO BASE STATION, MOBILE STATION, CHANNEL TRANSMISSION CONTROL METHOD, AND CHANNEL TRANSMISSION CONTROL PROGRAM

(75) Inventors: Masayuki Motegi, Yokohama (JP); Hideki Tobe, Kawasaki (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 421 days.

(21) Appl. No.: 10/880,520

(22) Filed: Jul. 1, 2004

(65) Prior Publication Data

US 2005/0030918 A1 Feb. 10, 2005

(30) Foreign Application Priority Data

Jul. 1, 2003 (JP) ............................ P2003-189833

(51) Int. Cl.
*H04Q 7/00* (2006.01)
*H04Q 7/20* (2006.01)
*H04B 7/212* (2006.01)
*H04L 12/43* (2006.01)

(52) U.S. Cl. ........................ 370/329; 370/328; 370/348; 370/458; 455/450; 455/458; 455/515

(58) Field of Classification Search ................. 455/458, 455/515, 450; 370/328, 329, 348, 458
See application file for complete search history.

(56) References Cited

U.S. PATENT DOCUMENTS 6,505,058 B1 * 1/2003 Willey ........................ 455/574

6,826,408 B1 * 11/2004 Kim et al. .................... 455/466
7,162,257 B2 * 1/2007 Kim et al. .................... 455/458
2003/0099214 A1 * 5/2003 Schmidt et al. ............. 370/328
2003/0114156 A1 * 6/2003 Kinnavy ..................... 455/434

(Continued)

FOREIGN PATENT DOCUMENTS

EP 1 107 626 6/2001

(Continued)

OTHER PUBLICATIONS

M. Motegi, et al., "Adaptive Battery Conservation Management for Multimedia Mobile Packet Communications", The Institute Of Electronics, Information and Communication Engineers, Technical Report of IEICE, pp. 135-140, Mar. 2003 (with English Abstract).

(Continued)

*Primary Examiner*—Barry Taylor
(74) *Attorney, Agent, or Firm*—Oblon, Spivak, McClelland, Maier & Neustadt, P.C.

(57) ABSTRACT

In a mobile communication system 1 having a radio base station 2, and mobile stations 5, 6 configured to communicate with the base station 2 and segmented into a plurality of mobile station groups, the base station 5 provides a broadcast channel with first instruction information to notify the mobile station 5 of whether or not to receive the broadcast channel, provides a paging channel with second instruction information to notify the mobile station 5 of the presence/absence of paging information, and performs such a channel transmission control as to intermittently transmit the broadcast channel and the paging channel on a control channel.

3 Claims, 15 Drawing Sheets

U.S. PATENT DOCUMENTS

2003/0148785 A1* 8/2003 Mangal et al. ............. 455/552
2004/0029586 A1 2/2004 Laroia et al.

FOREIGN PATENT DOCUMENTS

| EP | 1 318 687 | 6/2003 |
| JP | 5-75528 | 3/1993 |
| WO | 95/12932 | 5/1995 |
| WO | 98/42112 | 9/1998 |
| WO | 00/30328 | 5/2000 |

OTHER PUBLICATIONS

Digital Automobile Telephone System Standards ARIB-RCR-STD-27H version, pp. 85-95, (with partial English translation) Publication Date: Feb. 2, 1999.

W-CDMA Mobile Telecommunications Systems, Published by Maruzen, pp. 114-115, (with partial English translation) Publication Date: Jun. 25, 2001.

* cited by examiner

Fig.7
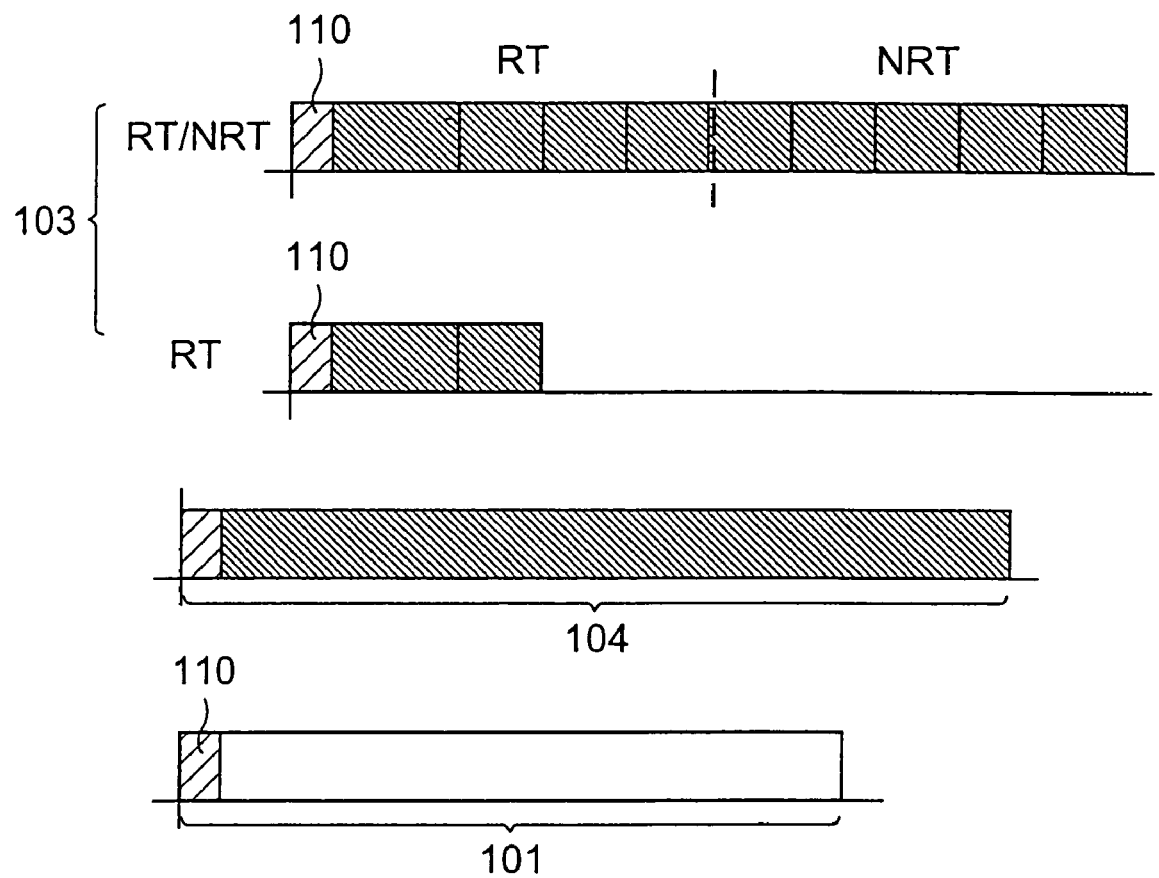
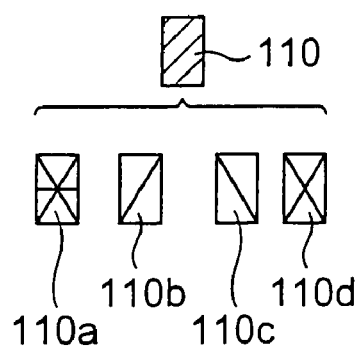

MOBILE COMMUNICATION SYSTEM, RADIO BASE STATION, MOBILE STATION, CHANNEL TRANSMISSION CONTROL METHOD, AND CHANNEL TRANSMISSION CONTROL PROGRAM

BACKGROUND OF THE INVENTION

1. Field of the Invention

The present invention relates to a mobile communication system, a radio base station, a mobile station, and a channel transmission control method and a channel transmission control program.

2. Related Background Art

In the mobile communication systems, there has been a tendency toward lower power consumption of mobile stations in connection with realization of fast transmission. For this reason, there was the known technology of effecting battery saving at mobile stations, by noting that data is intermittently (burstlike) transmitted in packet communication and by letting the mobile stations intermittently receive control signals from a radio base station (intermittent reception) in periods of transmitting or receiving no data between transmission timings of packet (e.g., cf. Non-patent Document 1).

In this Non-patent Document 1, three states of the mobile stations are set: a state in communication (active mode), a state of no communication (idle mode), and a state of effecting battery saving even in the active mode (battery saving mode: BSM). Two types of packets are set: real time packet and non real time packet; and two types of transmission forms are also set: real time transmission and non real time transmission. A permissible delay time for packet is define-d according to either of the transmission forms (a packet is discarded after the passage of the delay time), and a transition timing into BSM and an intermittent reception period at the mobile stations are defined according to the delay time.

Also disclosed was PDC (Personal Digital Cellular: digital automobile telephone system) having a subframe of a 3-slot configuration, assigning one predetermined slot out of the three slots for transmission of control signal, and configuring a system in time division (e.g., cf. Non-patent Document 2).

There was also another known technology in a mobile communication system in which a base station transmitted a termination control channel having grouped slots to each of grouped mobile stations and in which each mobile station was able to intermittently receive a slot containing termination information of a group of its own, wherein there were provided a plurality of intermittent reception modes with different transmission intervals of the slot containing the termination information (e.g., cf. Patent Document 1).

Furthermore, there was still another known technology in which a base station transmitted an indicator for notifying a mobile station of the presence/absence of termination, in a paging channel to each of grouped mobile stations and in which only when a mobile station in a standby state was notified of termination by an indicator, it received the paging channel in a radio frame on a common channel corresponding to the indicator (e.g., cf. Non-patent Document 3).

[Non-patent Document 1] Adaptive battery saving control methods in multimedia radio packet communications, Institute of Electronics, Information and Communication Engineers, Information Network Study Group, March 2002

[Non-patent Document 2] Digital Automobile Telephone System Standards ARIB RCR-STD-27H version

[Non-patent Document 3] W-CDMA mobile telecommunications systems, p114, published by Maruzen

[Patent Document 1] Japanese Patent Application Laid-Open No. 5-75528

SUMMARY OF THE INVENTION

Among the above-described conventional technologies, the conventional technology described in Patent Document 1 employs the variable period of intermittent reception (intermittent period). In this conventional technology, however, the state of the mobile station is not taken into consideration on the base station side and the intermittent period is primarily determined at each mobile station. For this reason, a mobile station capable of implementing a plurality of applications fails to apply an intermittent period corresponding to each application.

On the other hand, in the case of the conventional technology described in Non-patent Document 3, a mobile station performs a termination operation only when notified of the presence of termination by an indicator, thereby avoiding a reception operation of a vacant channel. In this conventional technology, however, the radio base station notifies the mobile station of the presence/absence of termination by providing a paging channel with an indicator, and forth is reason the mobile station needs to receive the broadcast channel, regardless of the presence/absence of paging information, which inevitably leads to consumption of power therefor. In addition, channel transmission efficiency was not so high, because the channel to transmit the indicator was different from a channel to actually transmit data (codes of the channels were different).

Furthermore, the radio base station notifies the mobile station of the presence/absence of termination (by the indicator), without consideration to the state of the mobile station. For this reason, the mobile station capable of implementing a plurality of applications was not always able to perform the termination control corresponding to an application in execution even though it was notified of the presence/absence of termination.

In the conventional technologies, as described above, the radio base station only notified the mobile station of the presence/absence of termination of the paging channel on the occasion of intermittent reception, without consideration to the state of the mobile station, and thus the intermittent reception sometimes failed to comply with the state of the mobile station. As described above, the conventional technologies were not always satisfactory in terms of the reduction of power consumption at the mobile stations.

The present invention has been accomplished to solve the above problems and an object of the present invention is therefore to provide a mobile communication system, a radio base station, a mobile station, and a channel transmission control method and a channel transmission control program capable of reducing the power consumption at the mobile station to effect satisfactory battery saving, based on appropriate intermittent reception according to a state of the mobile station.

In order to solve the above problems, an aspect of the present invention is a mobile communication system comprising a plurality of radio base stations, and a plurality of mobile stations configured to communicate with each of the radio base stations and segmented into a plurality of mobile station groups, wherein each of the radio base stations comprises means for providing a broadcast channel with first instruction information for notifying each mobile station of whether or not to receive the broadcast channel including a change announce of a paging period, means for providing a paging channel with second instruction information for notifying each mobile station of the presence/absence of paging information, and intermittent transmission control means for performing such a control as to intermittently transmit the broadcast channel provided with the first instruction information and the paging channel provided with the second instruction information on a control channel, and wherein each of the mobile stations comprises instruction information detecting means for detecting the first instruction information and the second instruction information transmitted on the control channel, broadcast channel analyzing means for analyzing the first instruction information detected by the instruction information detecting means and for determining whether or not to receive the broadcast channel, and paging channel reception control means for controlling whether or not to receive the paging channel, based on the second instruction information detected by the instruction information detecting means.

In this mobile communication system, the radio base station transmits the broadcast channel provided with the first instruction information and the paging channel provided with the second instruction information on the control channel. The mobile station analyzes the first instruction information to determine whether or not to receive the broadcast channel, so that it can receive the broadcast channel only when necessary. The paging period can be changed by the broadcast channel. Furthermore, since whether or not to receive the paging channel is controlled by the second instruction information, the mobile station can receive the paging channel only when necessary.

The present invention provides a radio base station forming a mobile communication system comprising a plurality of radio base stations, and a plurality of mobile stations configured to communicate with each of the radio base stations and segmented into a plurality of mobile station groups, the radio base station comprising: means for providing a broadcast channel with first instruction information for notifying each mobile station of whether or not to receive the broadcast channel including a change announce of a paging period; means for providing a paging channel with second instruction information for notifying each mobile station of the presence/absence of paging information; and intermittent transmission control means for performing such a control as to intermittently transmit the broadcast channel provided with the first instruction information and the paging channel provided with the second instruction information on a control channel.

Since this radio base station is configured to provide the broadcast channel with the first instruction information, to provide the paging channel with the second instruction information, and to perform the control to transmit them on the control channel, it becomes feasible for the mobile station side to perform a channel reception control, based on reception of the first and second instruction information transmitted on the control channel.

Preferably, the radio base station further comprises state managing means for managing states of the respective mobile stations; and period setting means for setting a plurality of paging periods for the paging channel, according to the states of the respective mobile stations managed by the state managing means.

When comprising these means, each radio base station sets the paging period of the paging channel according to a state of each mobile station.

Furthermore, the state managing means can be configured to comprise a storage part for storing the states of the respective mobile stations, and a state update part for updating the storage part when a change of a state of a mobile station is notified of by the mobile station. In this configuration, the radio base station can sequentially perform the change of the state of the mobile station.

Preferably, the period setting means sets a shortest period out of the paging periods as a fundamental period, and sets the other paging periods to integral multiples of the fundamental period. This permits the radio base station to readily perform the control for setting each paging period.

Furthermore, preferably, any one of the above-described radio base stations further comprises traffic managing means for measuring a traffic pattern of communication with each mobile station.

When comprising this traffic managing means, the radio base station can set the paging period according to the traffic pattern.

The present invention also provides a mobile station forming a mobile communication system comprising a plurality of radio base stations, and a plurality of mobile stations configured to communicate with each of the radio base stations and segmented into a plurality of mobile station groups, the mobile station comprising: instruction information detecting means for detecting first instruction information provided to a broadcast channel and second instruction information provided to a paging channel, the broadcast channel and the paging channel being transmitted on a control channel from a radio base station; broadcast channel analyzing means for analyzing the first instruction information detected by the instruction information detecting means and for determining whether or not to receive the broadcast channel; and paging channel reception control means for controlling whether or not to receive the paging channel, based on the second instruction information detected by the instruction information detecting means.

Since this mobile station determines whether or not to receive the broadcast channel by analyzing the first instruction information, it can receive the broadcast channel only when necessary. The paging period can also be changed by the broadcast channel. Furthermore, since whether or not to receive the paging channel is controlled by the second instruction information, the mobile station can receive the paging channel only when necessary.

Preferably, the mobile station further comprises timing setting means for setting a reception timing of the paging channel according to the broadcast channel, and the paging channel reception control means controls whether or not to receive the paging channel in the reception timing set by the timing setting means.

Since the change of the paging period is notified of by the broadcast channel, the mobile station can appropriately change the reception timing of the paging channel by the means for setting the reception timing of the paging channel according to the broadcast channel.

Preferably, these mobile stations further comprise state transition detecting means for detecting a state transition, and notifies a radio base station of the state transition detected by the state transition detecting means. This configuration permits the mobile station to notify the radio base station of the state change at the mobile station.

Furthermore, the present invention provides a channel transmission control method from a radio base station to a mobile station at a plurality of radio base stations, and at a plurality of mobile stations configured to communicate with each of radio base stations and segmented into a plurality of mobile station groups, the channel transmission control method comprising the steps of: the radio base station's providing a broadcast channel with first instruction information for notifying the mobile station of whether or not to receive the broadcast channel including a change announce of a paging period; providing a paging channel with second instruction information for notifying the mobile station of the presence/absence of paging information; and performing such a control as to intermittently transmit the broadcast channel provided with the first instruction information and the paging channel provided with the second instruction information on a control channel.

The present invention also provides a channel transmission control program for implementing a channel transmission control from a radio base station to a mobile station at a plurality of radio base stations, and at a plurality of mobile stations configured to communicate with each of the radio base stations and segmented into a plurality of mobile station groups, the channel transmission control program making a computer function as: means for providing a broadcast channel with first instruction information for notifying the mobile station of whether or not to receive the broadcast channel including a change announce of a paging period; means for providing a paging channel with second instruction information for notifying the mobile station of the presence/absence of paging information; and means for performing such a control as to intermittently transmit the broadcast channel provided with the first instruction information and the paging channel provided with the second instruction information on a control channel.

As detailed above, the present invention successfully achieves the reduction of power consumption at the mobile station and the excellent battery saving, based on the appropriate intermittent reception according to the state of the mobile station.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 7A is an illustration showing an example of the broadcast channel and paging channels shown in FIG. 6, and FIG. 7B an illustration showing the contents of an indicator.

DESCRIPTION OF THE PREFERRED EMBODIMENTS

Embodiments of the present invention will be described below. The same elements will be denoted by the same reference symbols, without redundant description.

First Embodiment (Configuration of Mobile Communication System)

Figure 1:
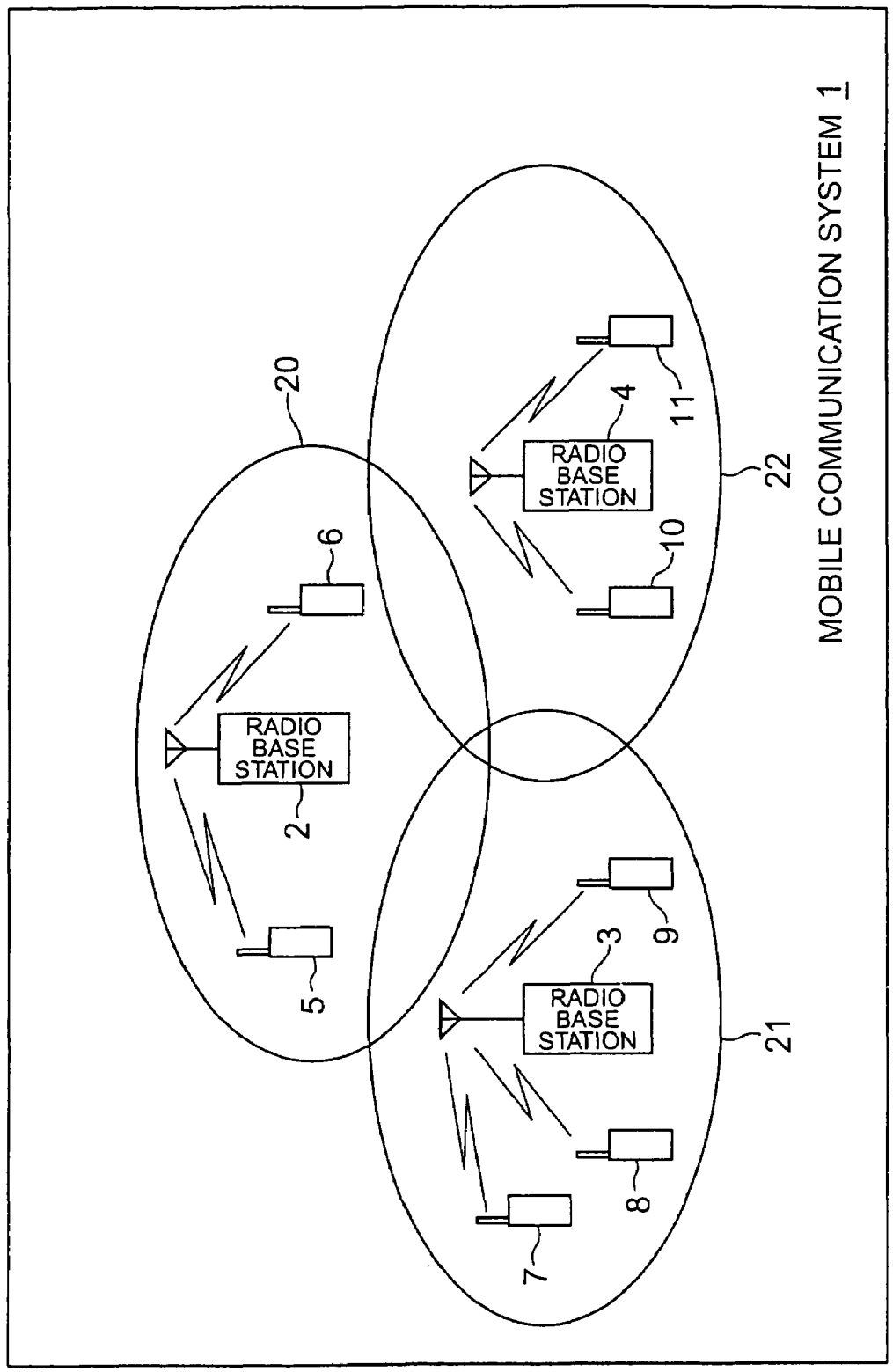
FIG. 1 is a system configuration diagram of a mobile communication system according to an embodiment of the present invention.

FIG. 1 is a system configuration diagram of mobile communication system 1 according to an embodiment of the present invention. The mobile communication system 1 has a plurality of radio base stations 2, 3, 4 and a plurality of mobile stations 7, 8, 9, 10, 11.

The radio base stations 2, 3, 4 are installed in a simultaneous paging area under control of a control station not shown, and communicate with mobile stations located in their respectively covering radio zones 20, 21, 22. Namely, the radio base station 2 communicates with the mobile stations 5, 6, the radio base station 3 with the mobile stations 7, 8, 9, and the radio base station 4 with the mobile stations 10, 11. The mobile stations are segmented into a plurality of groups and each mobile station intermittently receives a paging channel corresponding to a group of its own from a corresponding base station.

Figure 2:
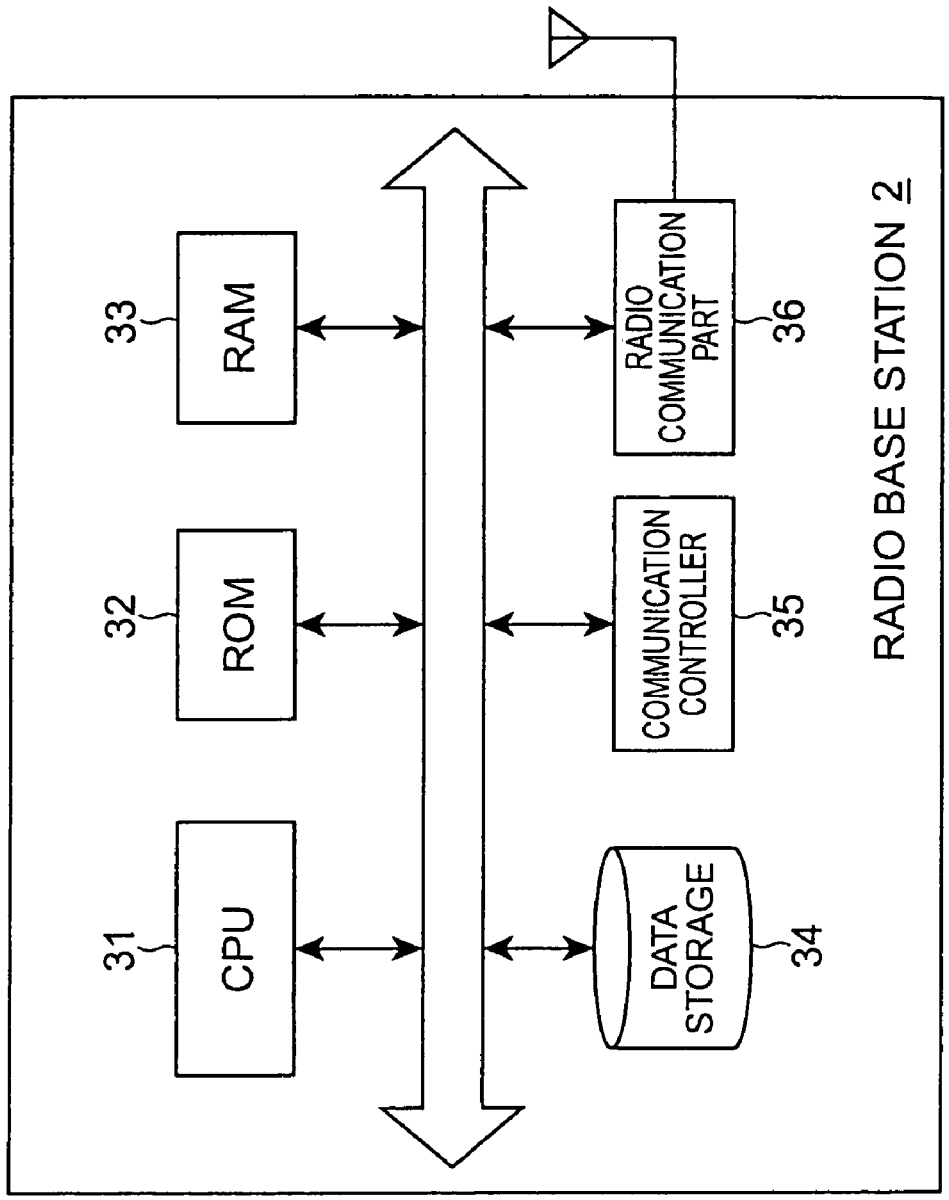
FIG. 2 is a block diagram showing an interior configuration of a radio base station.

The base station 2, as shown in FIG. 2, has a CPU 31, a ROM 32, and a RAM 33 and also has a data storage part 34, a communication control part 35, and a radio communication part 36. Since the base stations 3, 4 have the same configuration as the base station 2, the detailed description thereof is omitted.

Figure 3:
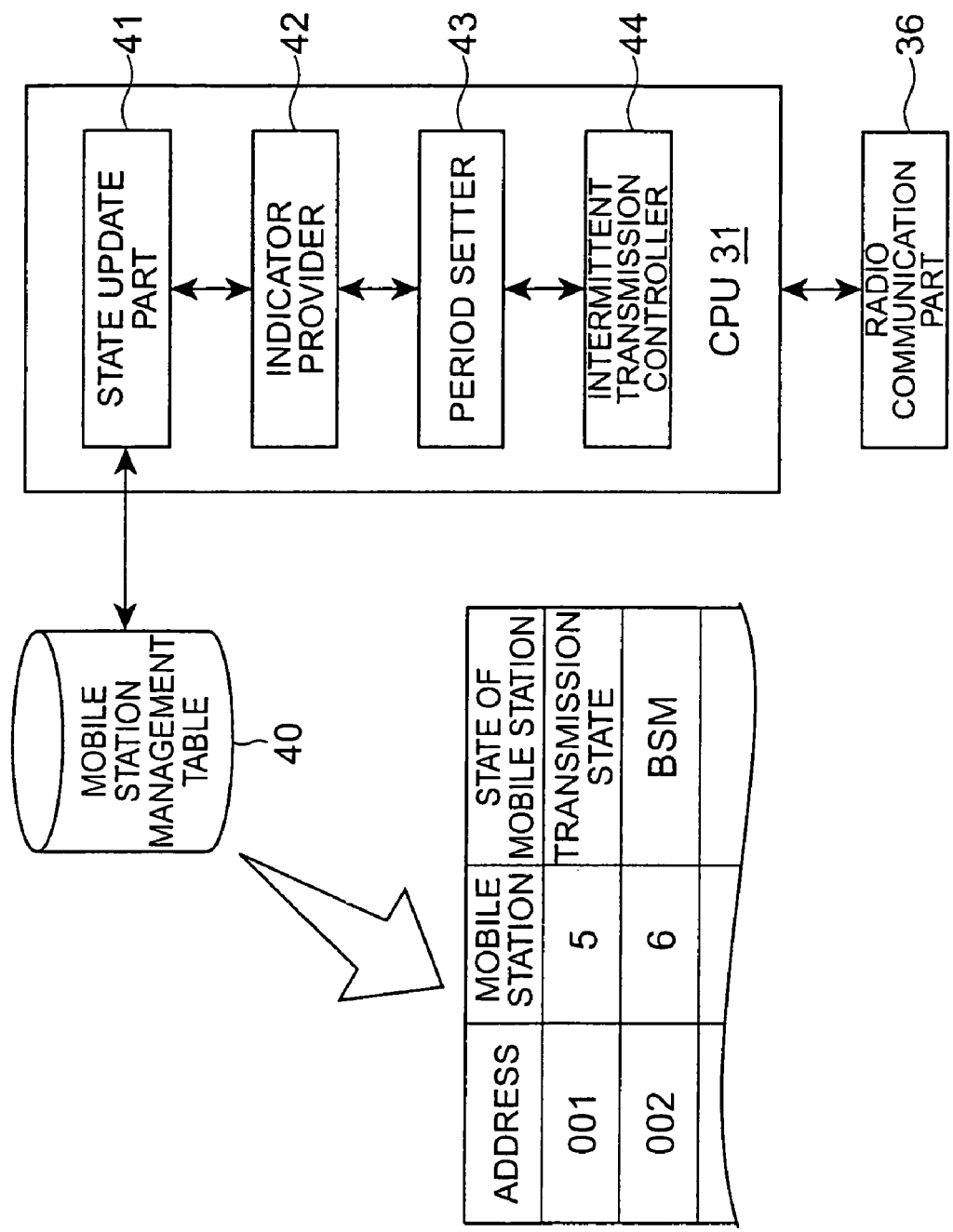
FIG. 3 is a block diagram showing each of means implemented by a CPU in a radio base station and a diagram showing a mobile station management table.

The CPU 31 operates according to a program stored in the ROM 32 and controls the overall operation of the base station 2. The CPU 31 operates as each of parts shown in FIG. 3. Namely, the CPU 31, as shown in FIG. 3, operates as a state update part 41, as an indicator providing part 42, as a period setting part 43, and as an intermittent transmission control part 44. The details of operations of these parts will be described later.

The ROM 32 stores programs to be executed by the CPU 31, and the RAM 33 stores data necessary for execution of the programs by the CPU 31. The data storage part 34 stores permanent data necessary for management of the mobile communication system 1 and a mobile station management table 40 described later. The communication control part 35 operates in response to instructions from the CPU 31 to control connections and disconnections of links for communication with the mobile stations 5, 6. The radio communication part 36 operates according to the control of the communication control part 35 to execute transmission/reception of data by radio. Namely, the radio communication part 36 is configured to convert information to be transmitted to the mobile station 5 or 6, into a signal handled in a mobile communication network and then transmit it on a radio wave, and is also configured to receive a radio wave from the mobile station 5 or 6 and extract information from a signal superimposed on the received radio wave.

Figure 4:
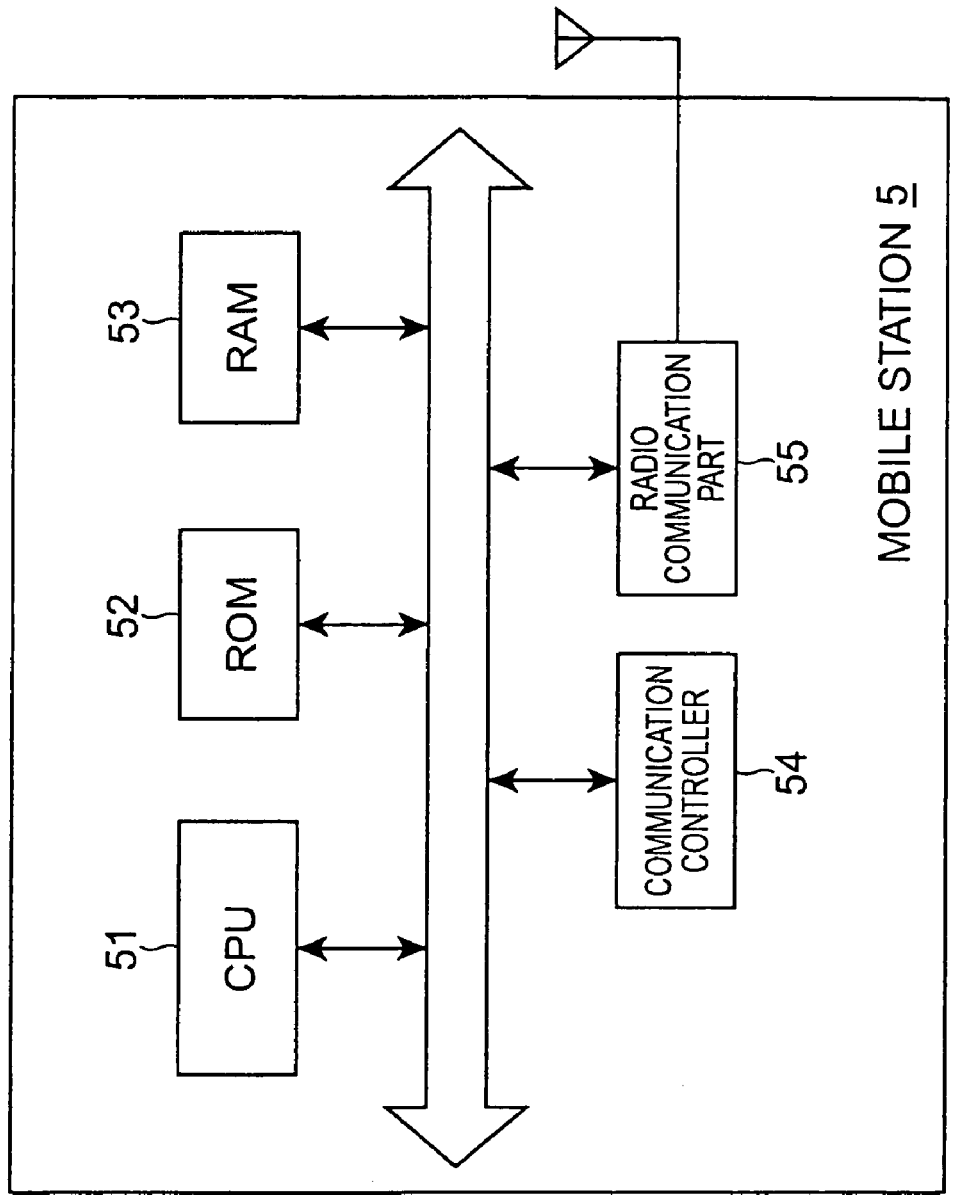
FIG. 4 is a block diagram showing an interior configuration of a mobile station.

The mobile station 5, as shown in FIG. 4, has a CPU 51, a ROM 52, and a RAM 53 and also has a communication control part 54 and a radio communication part 55. Since the other mobile stations also have the same configuration as the mobile station 5, the detailed description thereof is omitted.

Figure 5:
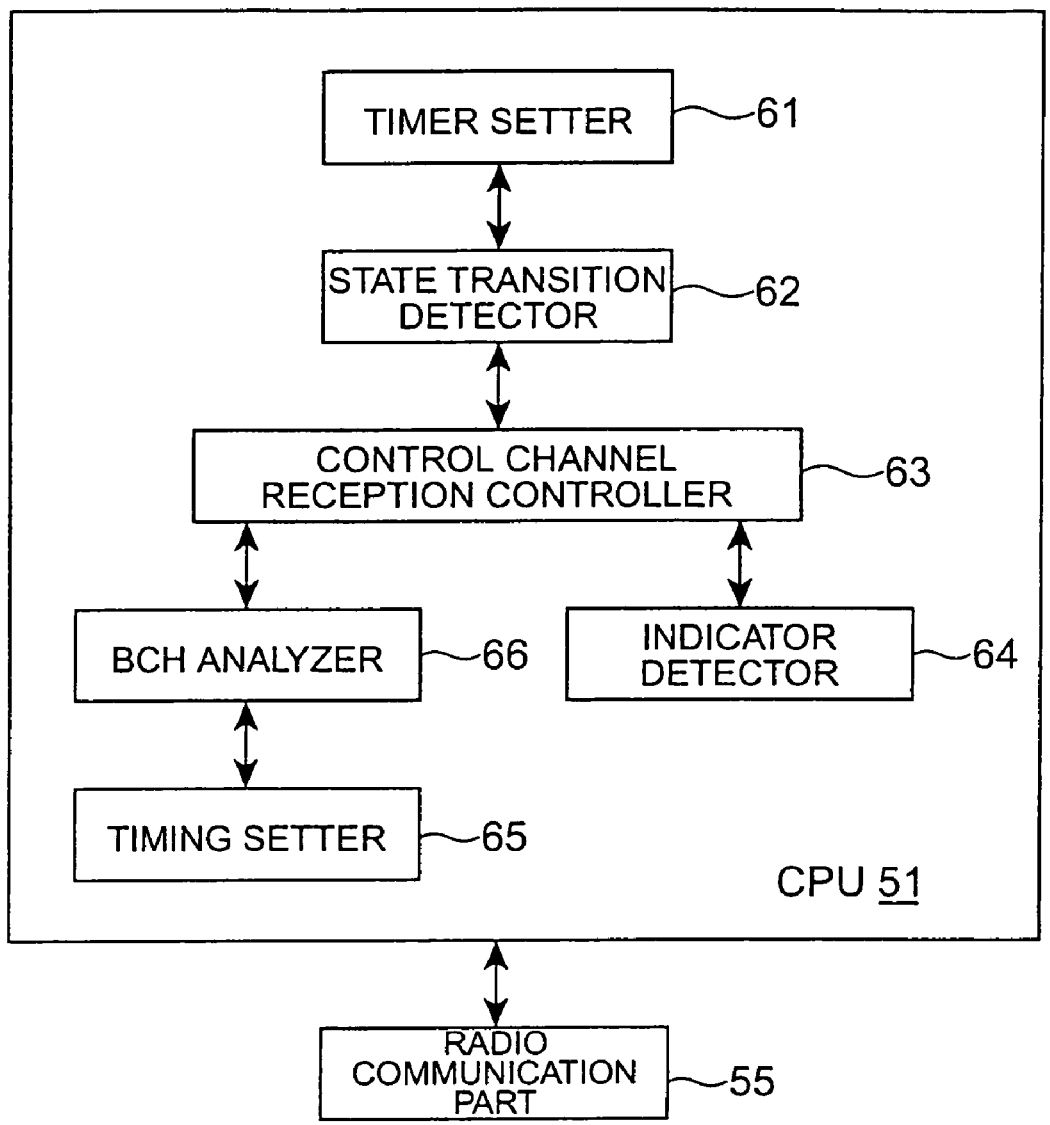
FIG. 5 is a block diagram showing each of means implemented by a CPU in a mobile station.

The CPU 51 operates according to a program stored in the ROM 52 and controls the overall operation of the mobile station 5. The CPU 51 acts as each of parts shown in FIG. 5. Namely, the CPU 51, as shown in FIG. 5, operates as a timer setting part 61, as a state transition detection part 62, and as a control channel reception control part 63, also operates as an indicator detection part 64 and as a timing setting part 65, and further operates as a broadcast channel analysis part (BCH analyzer) 66. The details of operations of these parts will be described later.

The ROM 52 stores programs to be executed by the CPU 51, and the RAM 53 stores data necessary for execution of the programs by the CPU 51. The communication control part 54 operates in response to instructions of the CPU 51 to control connections and disconnections of links for communication with the base station 2. The radio communication part 55 executes transmission/reception of data by radio in accordance with the control of the communication control part 54. Namely, the radio communication part 55 is configured to convert information to be transmitted to the base station 2, into a signal handled in a mobile communication network and then transmit it on a radio wave, and is also configured to receive a radio wave from the base station 2 and extract information from a signal superimposed on the received radio wave.

(Configuration of Control Channel)

Figure 6:
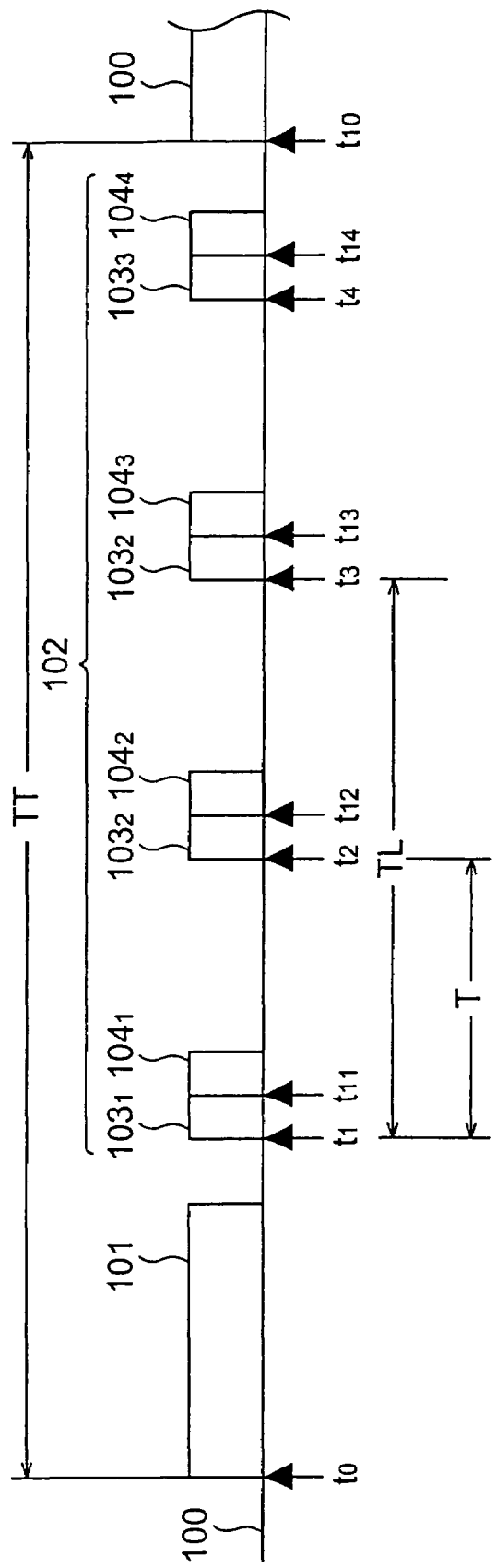
FIG. 6 is an illustration showing an example of broadcast channels and paging channels transmitted on a common control channel.

Next, a control channel set as a common channel (common control channel) to the mobile stations by each radio base station in the mobile communication system 1 will be described with reference to FIGS. 6 and 7. FIG. 6 is an illustration showing an example of broadcast channels and paging channels transmitted on the common control channel, and FIG. 7 is an illustration showing an example of the broadcast channels and paging channels shown in FIG. 6.

As shown in FIG. 6, a broadcast channel (BCH) 101 and paging channels (PCHs) 102 are transmitted on the common control channel 100 so that the paging channels (PCHs) 102 are transmitted subsequent to the broadcast channel (BCH) 101. The broadcast channel 101 is a channel for transmitting broadcast information containing information for notifying the mobile stations of a change of a paging period. The paging channels 102 are channels for transmitting paging information.

The paging channels 102 consist of paging channels 103 transmitted to the mobile stations in the battery saving mode (BSM), and paging channels 104 transmitted to the mobile stations in the idle mode. A plurality of paging channels 103 are set according to transmission forms, as shown in FIG. 7A. In the present embodiment, there are two types of transmission forms set: real time transmission (RT) and non real time transmission (NRT); the paging channels 103 are set for each of the real time transmission (RT) and the non real time transmission (NRT). Namely, a paging channel 103 for the battery saving mode is set for each of the two transmission forms of real time (RT) and non real time (NRT)

The paging channels 103 for the real time transmission (RT) are sent out at timings $t_1$, $t_2$, $t_3$, and $t_4$, and the paging channels 103 for the non real time transmission (NRT) are sent out at the timings $t_1$ and $t_3$, subsequent to the paging channel 103 for the real time transmission (RT).

A paging channel 104 is provided between each two paging channels 103 ($103_1$, $103_2$, $103_3$, $103_4$) and, from the transmission timing closest to the broadcast channel 101, the paging channels ($104_1$, $104_2$, $104_3$, $104_4$) corresponding to the respective groups are set in order. The paging channels 104 are sent out at timings $t_{11}$, $t_{12}$, $t_{13}$, and $t_{14}$.

The battery saving mode means, for example, a state in which a page is downloaded as in browsing of Web (a download period is a period of receiving packets on a burst basis) and in which during a period of time of browsing the downloaded page (this period of time is a non-transmission/non-reception period without burstlike reception of packet) the mobile station 5 intermittently receives signals transmitted from the base station 2, thereby curbing consumption of the battery. The idle mode means a state in which no packet is transmitted or received over a long period and in which the mobile station 5 intermittently receives signals from the base station 2.

When the paging period is set long, the frequency of reception operation at the mobile station 5 becomes low, and it is thus effective in curbing consumption of the battery. However, if the paging period is set long, the mobile station 5 receives the paging signal with a delay and the response at the mobile station 5 can become poor. Among the states of the mobile station 5 assumed in the present embodiment, the real time transmission imparts the hardest restrictions on the delay. The real time transmission is required to have the response as quick as possible. In the present embodiment, therefore, the paging period (transmission timing of paging signal 103) in the battery saving mode (RT) is set as a fundamental period T; specifically, the fundamental period T is 40 (ms). Supposing the permissible delay is t (ms), the transmission timings satisfying the permissible delay t are calculated in consideration of errors in a radio interval, a capacity of the paging channel (the number of mobile stations that can be paged by one paging), and packet arrival frequency.

For the other state of the battery saving mode at the mobile station 5, the paging period is set to an integral multiple of the fundamental period. This permits the base station 2 to readily perform the control for setting each paging period. Specifically, the paging signal transmission timing (paging period of paging channel 103) TL for the battery saving mode (NRT) is set to be double the fundamental period T (i.e., 80 ms) in the present embodiment. Accordingly, the grouping number in the battery saving mode (NRT) is set to 2. The intermittent period TT (transmission timing of broadcast channel 101) for the idle mode is set to be 32 times the fundamental period T (i.e., 1.28 s) in the present embodiment. From this, the grouping number in the idle mode is set to 32. When the mobile station 5 is in the idle mode, it usually receives only a BSC indicator 110a of its own group out of later-described BSC indicators 110a provided to the broadcast channels 101.

In the present embodiment, an indicator 110 is provided at the head of a broadcast channel 101 and at the head of each paging channel 103.

The indicator 110 is set with the following four types as shown in FIG. 7B. Namely, there are four types of indicators to be set: indicator 110a for the broadcast channel (BSC indicator 110a), indicator 110b for the idle mode (IM indicator 110*b*), indicator 110*c* for the battery saving mode (RT) (RT indicator 110*c*), and indicator 110*d* for the battery saving mode (NRT) (NRT indicator 110*d*).

Each indicator 110*a*-110*d* is provided as a common indicator to the broadcast channels 101 and paging channels 103, and flags specific to the respective indicators are set therein. Namely, an indicator 110 has four types of flags (e.g., each flag is assigned information of one bit), and a type of an indicator can be identified by the flags. The IM indicator 110 is provided with a flag according to a corresponding group.

Among these indicators 110, the BSC indicator 110*a* functions as first instruction information for notifying each mobile station of whether or not to receive a broadcast channel. The IM indicator 110*b*, the RT indicator 110*c*, and the NRT indicator 110*d* function as second instruction information for notifying each mobile station of the presence/absence of paging information.

Since the common control channel 100 has the configuration as described above, each mobile station is able to detect a portion corresponding to its own group out of the BSC indicator 110*a* provided at the head of the broadcast channel 101, to analyze the contents thereof to determine whether or not to receive the broadcast channel 101, and to receive the broadcast channel 101 only when reception is necessary. Accordingly, each mobile station needs to receive the broadcast channel 101 only when necessary, whereby the mobile station does not have to perform any waste reception operation. Therefore, the power consumption at the mobile station is reduced, so as to achieve better battery saving.

A received broadcast channel 101 contains a changed paging period if the paging period is changed. A plurality of paging channels with different periods corresponding to the states of the mobile stations are set on the common control channel 100. Therefore, the mobile station 5 is configured to refer to the received broadcast channel 101 to determine the reception timing of the paging channel according to the state of its own, and to perform the intermittent reception corresponding to the state of its own. Accordingly, the mobile station is allowed to perform appropriate intermittent reception according to an application in execution, so that the power consumption at the mobile station is reduced, so as to achieve better battery saving.

Furthermore, in receiving the paging channel, the mobile station is configured to determine whether or not to receive the paging channel 103, based on the RT indicator 110*c* and the NRT indicator 110*d*, and to receive the paging channel 103 only when necessary. For this reason, each mobile station does not have to receive any unnecessary channels out of the paging channels 103 (it can avoid vacant reception of slot). Accordingly, each mobile station can achieve reduction of power consumption and better battery saving and also reduce the intermittent ratio.

Since in the mobile communication system 1 a plurality of periods are mounted on one common control channel 100, the radio resources are effectively utilized. Furthermore, since they are mounted on one common control channel 100, where the mobile communication system 1 is constructed as a CDMA system, it can be implemented by only one spreading code. The provision of the paging channels 103 also presents the effect of capability of assuring the delays according to classes of QOS (Quality of Service) defined by DSCP (Diff Serv Code Point: codes to determine operations of routers and others, for identifying types of traffics such as sound, moving picture, etc. and performing transfer processes suitable for the respective traffics.

(Operation Procedure between Radio Base Station and Mobile Station)

Figure 8:
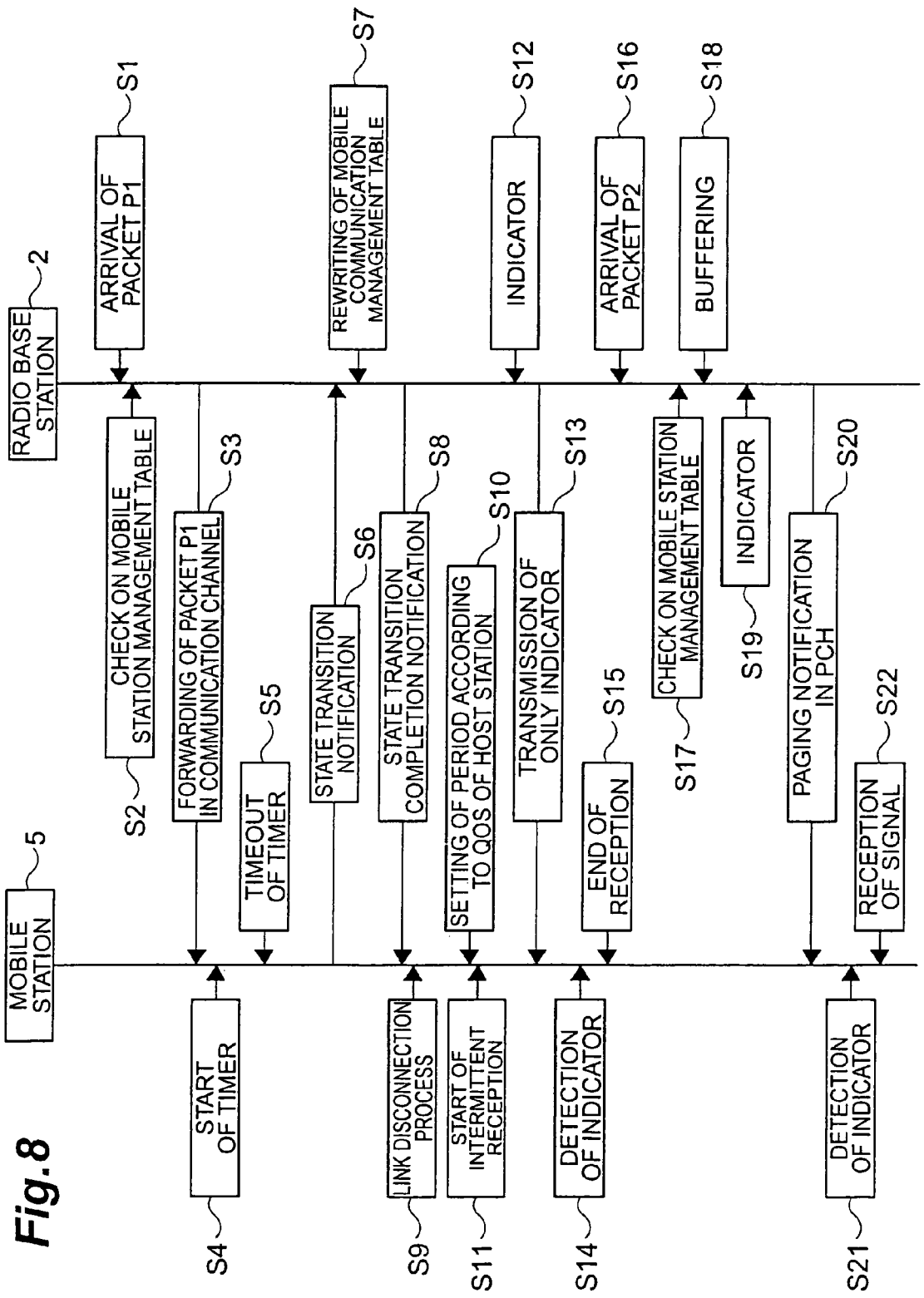
FIG. 8 is a chart showing an operation sequence carried out between a radio base station and a mobile station.

Next, an operation sequence between base station 2 and mobile station 5, for transmission and reception of the aforementioned common control channel 100, will be described. FIG. 8 is a chart showing the operation sequence carried out between base station 2 and mobile station 5. In FIG. 8 and FIGS. 9 to 14 described later, a step is abbreviated to S.

First, let us suppose that at step 1 a packet P1 from the control station not shown arrived at the base station 2. Then the base station 2 moves to step 2, whereat the CPU 31 operates to access the data storage part 34 to refer to the mobile station management table 40. The mobile station management table 40, as shown in FIG. 3, is a storage part for storing states of the respective mobile stations (mobile station 5 and mobile station 6) as communication partners of the base station 2, in which each mobile station and a state thereof are registered at a corresponding address and which is arranged in such away that each mobile station and a state thereof can be acquired by designating its address. The base station 2 refers to the mobile station management table 40 and determines that the state of the mobile station 5 as a destination of the arriving packet P1 is registered in the table and that it is "in communication." Then the base station moves to step 3 to forward the packet P1 to the mobile station 5 by a communication channel.

After completion of reception of the packet P1, the mobile station 5 proceeds to step 4, whereat the CPU 51 acts as the timer setting part 61 to start a timer, in order to make a transition into a standby state until arrival of a next packet. The mobile station 5 determines at subsequent step 5 whether the started timer made a timeout. With a timeout of the timer, the mobile station moves to step 6, whereat the CPU 51 operates as the state transition detection part 62 to detect a transition of the state. With a state transition into the standby state, the CPU 51 instructs the radio communication part 55 to transmit a state transition notification (a notification of the transition into the standby state herein) to the base station 2 by an uplink already established. By transmitting the state transition notification, the mobile station 5 notifies the base station 2 of the change of the state of its own.

When the base station 2 receives the state transition notification from the mobile station 5 through the radio communication part 36, it moves to step 7. Then the CPU 31 operates as the state update part 41 to access the data storage part 34 and update (rewrite) the mobile station management table 40, based on the received state transition notification. In the base station 2, therefore, the state of the mobile station 2 is sequentially updated and the state management is accurately carried out. In this manner, the base station 2 manages the state of the mobile station 5 by the mobile station management table 40. After the mobile station management table 40 is updated, the base station goes to step 8, whereat the CPU 31 instructs the radio communication part 36 to transmit a state transition completion notification to the mobile station 5.

When the mobile station 5 receives the state transition completion notification from the base station 2, it proceeds to step 9 to perform a disconnection process of the established link. At subsequent step 10, the CPU 51 operates as the timing setting part 65 to set a paging period according to the QOS requirement of the host station for the last received packet (packet P1 herein) Namely, the timing setting part 65 sets the paging period according to the state of the host station (i.e., a paging period suitable for an application that was in execution). Then the mobile station proceeds to step 11, whereat the CPU 51 operates as the control channel reception control part 63 to instruct the radio communication part 55 to start the intermittent reception in the set paging period.

On the other hand, in the base station 2 the CPU 31 operates as the period setting part 43 to set the paging period for notification of the paging signal to the mobile station in the state of intermittent reception of the paging signal (RT or NRT of the battery saving mode) according to the state of the mobile station 5. The CPU 31 also operates as the indicator providing part 42 to determine the presence/absence of paging information in the timing corresponding to the paging period and at step 12 it sets a flag in the indicator 110 according to the result of the determination (in this case, a flag for notification of the absence of paging information (e.g., "0") is set). Then the base station goes to step 13, whereat the CPU 31 operates as the intermittent transmission control part 44 to perform the control for (intermittent) transmission of the generated paging channel 102 on the common control channel according to the paging period set by the period setting part 43.

In the mobile station 5 the control channel reception control part 63 operates in the reception timing set by the timing setting part 65. At step 14 the control channel reception control part 63 instructs the radio communication part 55 to perform the reception operation of the paging channel 102, and, prior to the reception of the paging channel 102, the CPU 51 operates as the indicator detection part 64 to detect the indicator 110 provided at the head of the paging channel 102. From the detected indicator 110, the control channel reception control part 63 then determines whether or not to receive the paging channel 102. At this stage, the absence of paging information is determined by the set flag (e.g., "0"), and thus the mobile station moves to step 15 to end the reception operation without reception of the paging channel 102 and then again moves back into the intermittent reception state.

Next, let us suppose that at step 16 a next packet P2 from the control station arrived at the base station 2. The base station 2 goes to next step 17, whereat the CPU 31 accesses the data storage part 34 to refer to the mobile station management table 40. At this time, it is determined that the mobile station 5 as a destination of the packet P2 is still in the standby state. In the base station 2 the CPU 31 then operates as the intermittent transmission control part 44 to buffer the packet P2 to be transmitted, before the transmission timing of the paging channel 102 at step 18. Then the base station 2 goes to step 19 in the transmission timing of the paging channel 102 to operate the indicator providing part 42 to set a flag in the indicator 110 (a flag for notification of the presence of paging information (e.g., "1") is set herein) Then the base station goes to step 20, whereat the CPU 31 operates as the intermittent transmission control part 44 to perform the control for (intermittently) transmitting the paging channel 102 provided with the indicator 110, on the common control channel in accordance with the paging period set by the period setting part 43.

On the other hand, in the mobile station 5 the control channel reception control part 63 operates in the reception timing of the paging channel to perform the reception operation of the paging channel 102 at step 21 and, prior to the reception of the paging channel 102, the CPU 51 operates as the indicator detection part 64 to detect the indicator 110 provided at the head. From the detected indicator 110, the control channel reception control part 63 then determines whether or not to receive the paging channel 102. Since the f lag set herein (e.g., "1") indicates the presence of paging information, it determines that reception is necessary, and the control channel reception control part 63 receives the paging channel 102 subsequent to the indicator 110 at subsequent step 22.

The above operation is repeatedly carried out between the base station 2 and each mobile station 5, 6.

(Operation Procedure of Base Station)

Figure 9:
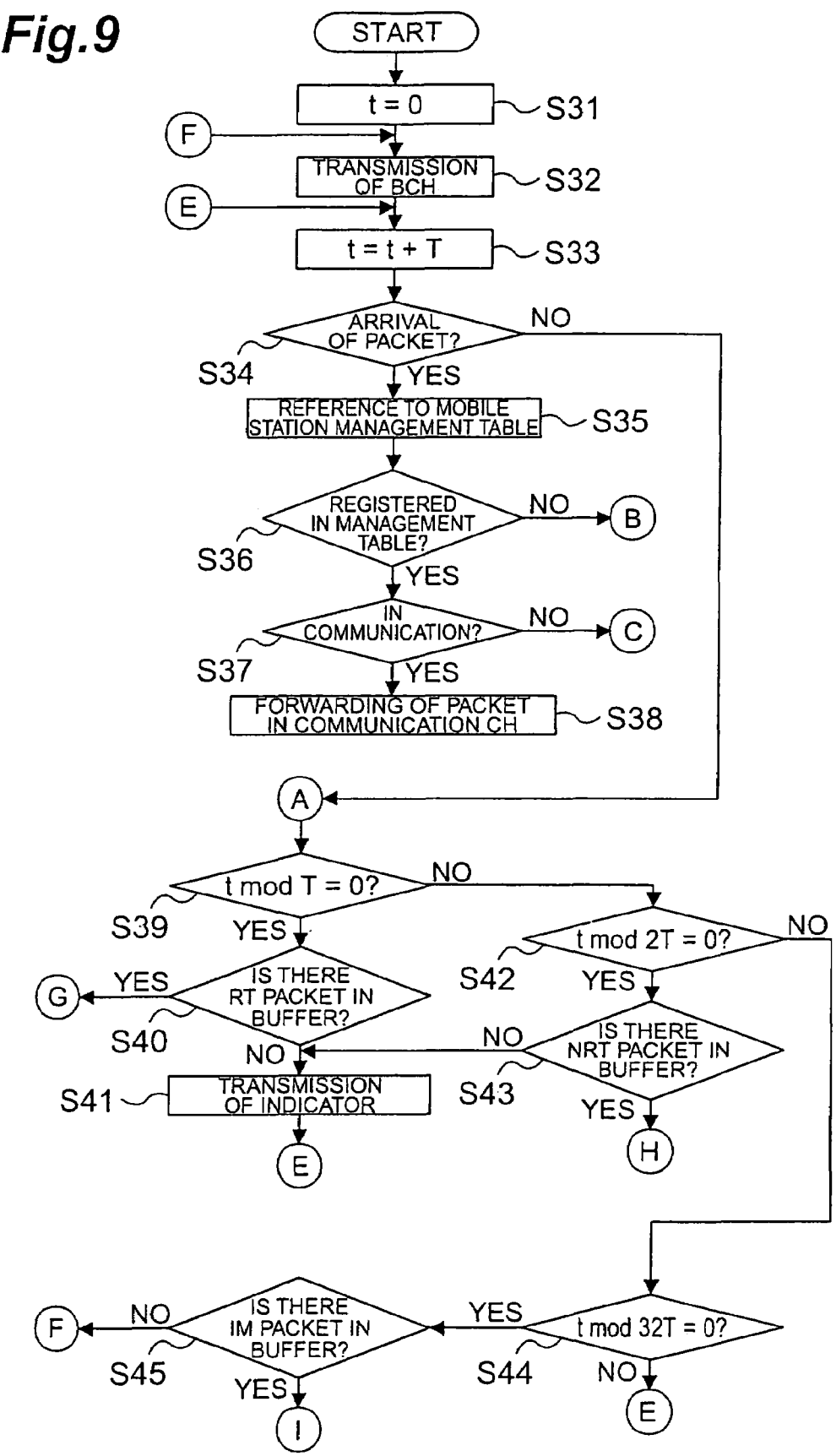
FIG. 9 is a flowchart showing the operation procedure at the radio base station in FIG. 8.
Figure 10:
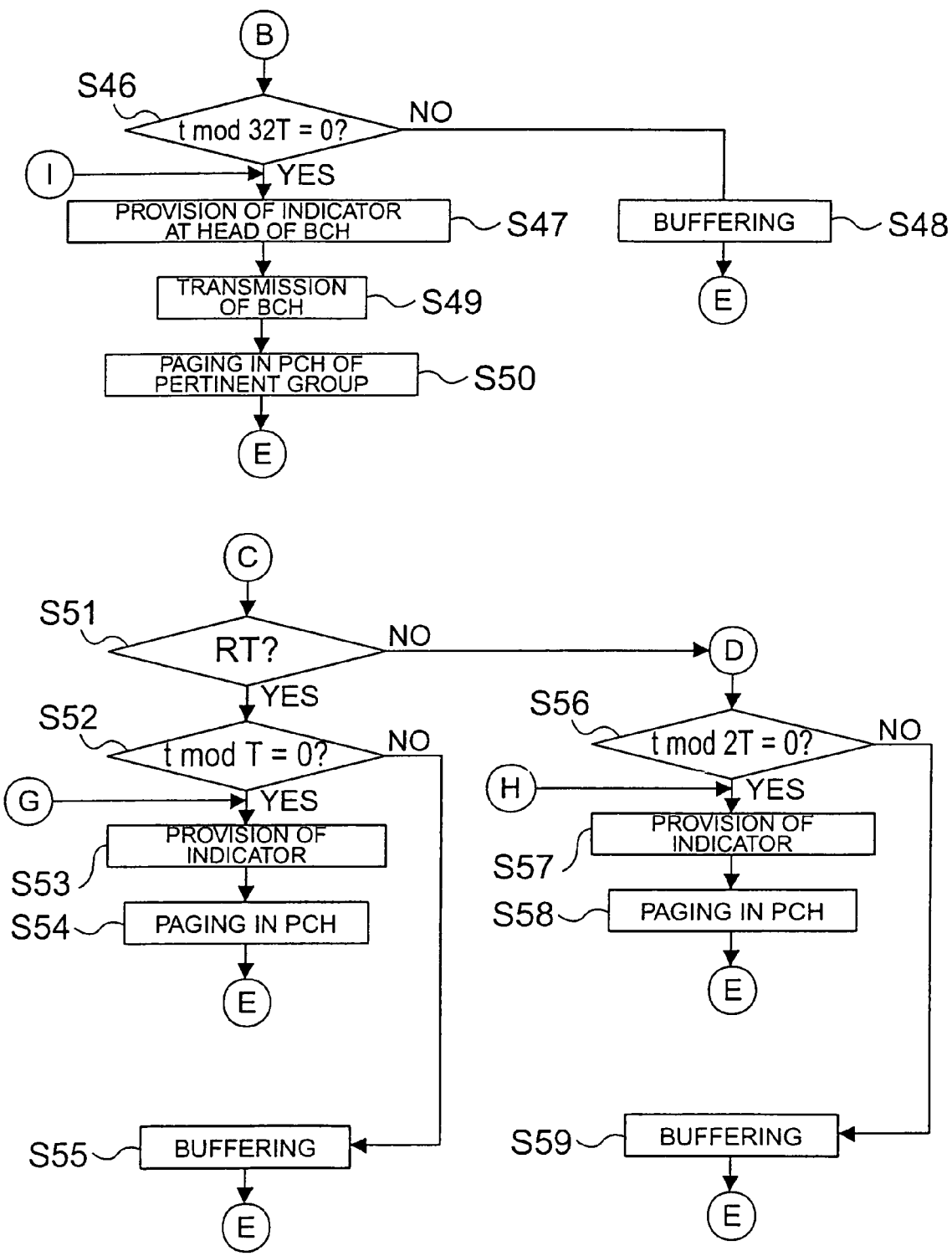
FIG. 10 is a flowchart showing the procedure subsequent to FIG. 9.

Next, the operation procedure of the base station in the aforementioned operation sequence will be described. FIGS. 9 and 10 are the flowchart showing the operation procedure of the base station.

In the base station 2 the CPU 31 executes the processing according to a program stored in the ROM 32. When the processing is started, the CPU moves to step 31 to first set the time t to 0 and to start measuring an elapsed time. At subsequent step 32, the intermittent transmission control part 44 operates to perform the control for transmission of the broadcast channel (BCH) to the mobile station 5 in the standby state, whereby the broadcast channel is transmitted to the mobile station. Then the CPU proceeds to step 33, whereat the CPU 31 adds the fundamental period T to the time t. Then the CPU 31 proceeds to step 34 to determine whether a packet from the control station not shown has arrived through the radio communication part 36. If a packet has arrived, the CPU 31 brings the processing forward to step 35. Without arrival of packet, the CPU 31 goes to step 39.

When the CPU goes to step 35 with arrival of a packet, the CPU 31 accesses the data storage part 34 to refer to the mobile station management table 40 and at subsequent step 36, it determines whether the mobile station 5 as a destination of the packet is registered in the mobile station management table 40. When the mobile station 5 is registered in the mobile station management table 40, the CPU moves to step 37 to determine whether the mobile station 5 is in communication, from the registration contents of the mobile station management table 40. When the mobile station 5 is in communication, the CPU 31 goes to step 38 to instruct the radio communication part 36 to forward the arriving packet by a communication channel, and then terminates the processing.

When the mobile station 5 is not in communication, the CPU 31 moves from step 37 to step 51, whereat the period setting part 43 sets the paging period according to the state of the mobile station 5 to set the intermittent period of the paging channel. Namely, when at the time of arrival of the packet the base station 2 manages the state of the mobile station as a destination of the packet, the packet is transmitted, or the paging period is set according to the state of the mobile station managed by the base station 2 and the paging channel is transmitted in the paging period (steps 51 to 59). When the state of the mobile station is not registered in the mobile station management table 40 and thus the state of the mobile station 5 is not managed by the base station 2, the CPU goes from step 36 to step 46 to notify the paging period by the broadcast channel 101.

When the CPU moves from step 34 to step 39, the period setting part 43 sets the paging period as described below and the intermittent transmission control part 44 performs the control for intermittent transmission of the paging channel in the set paging period before arrival of a packet.

First, at step 39 it is determined whether the time t is divisible by the fundamental period T (whether tmodT=0 or not) When tmodT=0 (i.e., when the time t is equal to the fundamental period T), the CPU goes to step 40. When it is not 0 (when the time t is not equal to the fundamental period T), the CPU goes to step 42. When moving to step 40, in order to transmit the paging channel in the timing corresponding to the fundamental period T, the CPU 31 operates as the period setting part 43 to set the paging period to the fundamental period T and, furthermore, the CPU 31 operates as the intermittent transmission control part 44 to determine whether there is any packet of the battery saving mode (RT) buffered in the buffer. If a packet is buffered the CPU goes to step 53; if no packet is buffered the CPU goes to step 41.

At step 41, there is no data to be transmitted, and thus the indicator providing part 42 provides the indicator 110c with a flag to announce the absence of paging information. Then the intermittent transmission control part 44 performs the control to transmit the generated paging channel 103 at the time t in accordance with the paging period set by the period setting part 43.

When moving to step 42, the CPU 31 determines whether the time t is divisible by double the fundamental period T (whether tmod2T=0). When tmod2T=0 (i.e., when the time t is equal to the intermittent period TL), the CPU 31 goes to step 43. When it is not 0 (when the time t is not equal to the intermittent period TL), the CPU goes to step 44. When moving to step 43, in order to transmit the paging channel in the timing corresponding to the intermittent period TL of double the fundamental period T, the frequency setting part 43 sets the intermittent period TL as the paging period and the intermittent transmission control part 44 determines whether any packet of the battery saving mode (NRT) is buffered in the buffer.

When a packet is buffered, the CPU moves to step 57. When no packet is buffered, the CPU goes to step 41. When moving to step 41, the indicator providing part 42 sets a flag to announce the absence of paging information, in the indicator 110d. Then the intermittent transmission control part 44 performs the control to transmit the generated paging channel 103 at the time t in accordance with the paging period set by the period setting part 43.

At step 44, the CPU 31 determines whether the time t is divisible by 32 times the fundamental period T (whether tmod32T=0). When tmod32T=0 (when the time t is equal to the intermittent period TT), the CPU goes to step 45. When it is not 0 (when the time t is not equal to the intermittent period TT), the CPU returns to step 33. When moving to step 45, the intermittent transmission control part 44 determines whether any packet of the idle mode is buffered in the buffer. When a packet is buffered, the CPU moves to step 47. When no packet is buffered, the CPU returns to step 32.

When moving to step 47, in order to transmit the broadcast channel in the timing corresponding to the intermittent period TT, the period setting part 43 sets the intermittent period TT as the paging period and the indicator providing part 42 provides the broadcast channel 101 with the indicator 110a. At subsequent step 49, the intermittent transmission control part 44 then performs the control to transmit the broadcast channel 101 at the time t in accordance with the paging period set by the period setting part 43. Furthermore, at step 50 the intermittent transmission control part 44 performs paging by a control to transmit the paging channel 103 of the group to which the mobile station 5 belongs, and then the CPU returns to step 33.

The CPU proceeds from step 36 to step 46 when the state of the mobile station 5 is not registered in the mobile station management table 40. At this time, the base station 2 transmits the broadcast channel, thereby transmitting information for setting of transmission timing (paging period) for the paging channel. In this case, the CPU 31 first determines at step 46 whether the time t is divisible by 32 times the fundamental period T (whether tmod32T=0). When tmod32T=0, the CPU moves to step 47. When it is not 0, the CPU goes to step 48. As moving to step 47, the steps 47, 49, and 50 are executed in the manner as described above and thereafter the CPU returns to step 33.

When moving to step 48, the intermittent transmission control part 44 performs buffering of the packet. Accordingly, the packet is buffered until the time t becomes equal to the intermittent period TT.

Furthermore, the CPU proceeds from step 37 to step 51 when the state of the mobile station 5 is registered in the mobile station management table 40. At this time, the CPU 31 determines whether the state of the mobile station 5 is the real time transmission. When it is the real time transmission, the CPU moves to step 52. When it is not the real time transmission, the CPU goes to step 56. At step 52, whether tmodT=0 is determined. When it is 0, the CPU proceeds to step 53. When it is not 0, the CPU moves to step 55. When moving to step 53, in order to transmit the paging channel in the timing corresponding to the fundamental period T, the period setting part 43 sets the fundamental period T as the paging period and the indicator providing part 42 provides the paging channel 103 with the indicator 110c. At subsequent step 54, the intermittent transmission control part 44 performs the paging by the control to transmit the paging channel 103 in accordance with the paging period set by the period setting part 43. At step 55, buffering of the packet is carried out and thereafter the CPU returns to step 33. Therefore, the packet is buffered until the time t becomes equal to the fundamental period T.

When the CPU proceeds from step 51 to step 56, whether tmod2T=0 is determined. When it is 0, the CPU goes to step 57. When it is not 0, the CPU goes to step 59. When moving to step 57, in order to transmit the paging channel in the timing corresponding to the intermittent period TL, the period setting part 43 sets the intermittent period TL as the paging period and the indicator providing part 42 provides the paging channel 103 with the indicator 110d. At subsequent step 58, the intermittent transmission control part 44 performs the paging by the control to transmit the paging channel 103 in accordance with the paging period set by the period setting part 43. At step 59 buffering of the packet is carried out and thereafter the CPU returns to step 33. Therefore, the packet is buffered until the time t becomes equal to the intermittent period TL.

In the mobile communication system 1 according to the present embodiment, as described above, the base station 2 registers the state of each mobile station in the mobile station management table 40 and sets a plurality of paging periods for the paging channel according to the states of the respective mobile stations registered in the mobile station management table 40. The paging channel is transmitted in accordance with the paging period thus set. For this reason, the mobile station 5 is able to receive the paging channel in the appropriate timing according to the state of its own. This permits the mobile station 5 to perform the intermittent reception in the appropriate timing according to the state of its own, whereby the power consumption can be reduced at the mobile station 5.

(Operation Procedure of Mobile Station)

Figure 11:
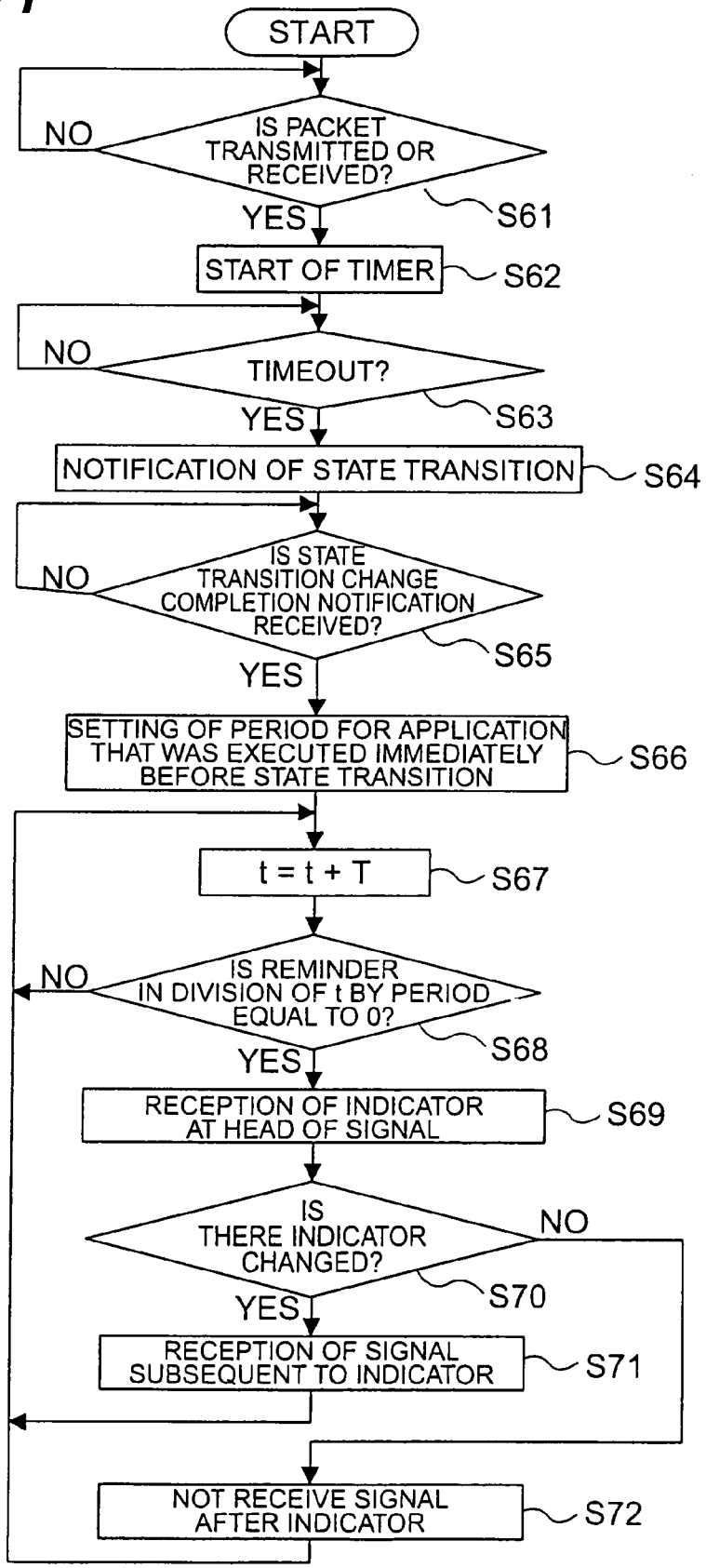
FIG. 11 is a flowchart showing the operation procedure at the mobile station in FIG. 8.

Next, the operation procedure of the mobile station in the aforementioned operation sequence will be described. FIG. 11 is the flowchart showing the operation procedure of the mobile station.

In the mobile station 5 the CPU 51 executes the processing in accordance with a program stored in the ROM 52. When the processing is started, the CPU goes to step 61, whereat the mobile station 5 stands by before reception of a packet. When a packet is received, the CPU goes to step 62. At this step the CPU 51 operates as the timer setting part 61 to start the timer for the transition into the battery saving mode until arrival of a next packet. After the timer is started, the mobile station 5 goes to step 63 to stand by until the started timer makes a timeout. With a timeout of the timer, the CPU moves to step 64, whereat the CPU 51 operates as the state transition detection part 62. When receiving a state transition into the standby state, the CPU 51 instructs the radio communication part 55 to transmit information to announce the state transition (state transition notification information) by an uplink already established. This causes the mobile station 5 to make a transition into the battery saving mode standby state, and the mobile station 5 notifies the base station 2 of the change of the state of its own.

Furthermore, at subsequent step 65, the mobile station 5 stands by before receiving a state transition completion notification from the base station 2. When it is received, the CPU goes to step 66. At step 66, the CPU releases the established link (or performs a disconnection process of the link) and sets the paging period according to the QOS requirement for the packet immediately before the state transition. Namely, the timing setting part 65 sets the paging period according to the state of the host station (i.e., a paging period suitable for an application that was in execution). Then the CPU 51 operates as the control channel reception control part 63 to perform such a control as to start the intermittent reception in the set paging period. After a transition into the intermittent reception state, the CPU adds the fundamental period T to the current time t at subsequent step 67. Thereafter, the CPU moves to step 68 to determine whether the set time t is divisible by the paging period (whether tmodT=0) When it is 0, the CPU goes to step 69. When it is not 0, the CPU returns to step 67.

The mobile station 5 proceeds to step 69, whereat the indicator detection part 64 operates in the reception timing set by the timing setting part 65 to first detect the indicator 110 provided at the head of the broadcast channel 101, in order to receive the paging signal 103 in accordance with the paging period. Then the CPU moves to step 70, whereat the broadcast channel analyzer 66 operates to analyze the detected indicator 110 (indicator 110a) to determine whether or not to receive the broadcast channel 101. When it is necessary to receive the broadcast channel 101, the CPU goes to step 71, whereat the control channel reception control part 63 receives the broadcast channel 101 subsequent to the indicator 110a. The reception of this broadcast channel 101 results in notifying the mobile station of the paging period suitable for the state after the state transition.

On the other hand, when the indicator 110a indicates that it is not necessary to receive the broadcast channel 101, there is no need for change of the paging period and then the CPU moves to step 72 not to receive the broadcast channel 101, and then returns to step 67.

In this manner, the mobile station is configured to determine whether or not to receive the broadcast channel, by the indicator 110a provided to the broadcast channel 101 and to receive the broadcast channel 101 only when it is necessary to receive the broadcast channel. Accordingly, the broadcast channel 101 is received only when necessary; therefore, no waste reception operation is carried out and the power consumption can be reduced thereby.

Since the broadcast channel 110 announces the paging period suitable for the state after the state transition, the mobile station is able to receive the paging channel in the paging period matching the state of its own.

Second Embodiment

The mobile communication system 1 according to the present embodiment has the same configuration as the mobile communication system 1 in the first embodiment, except for the configuration of the CPU 31 in the base station 2. The mobile communication system 1 of the present embodiment will be described below with focus on the differences from the mobile communication system 1, base station 2, and mobile station 5 in the first embodiment, and things in common will be omitted or simplified.

Figure 15:
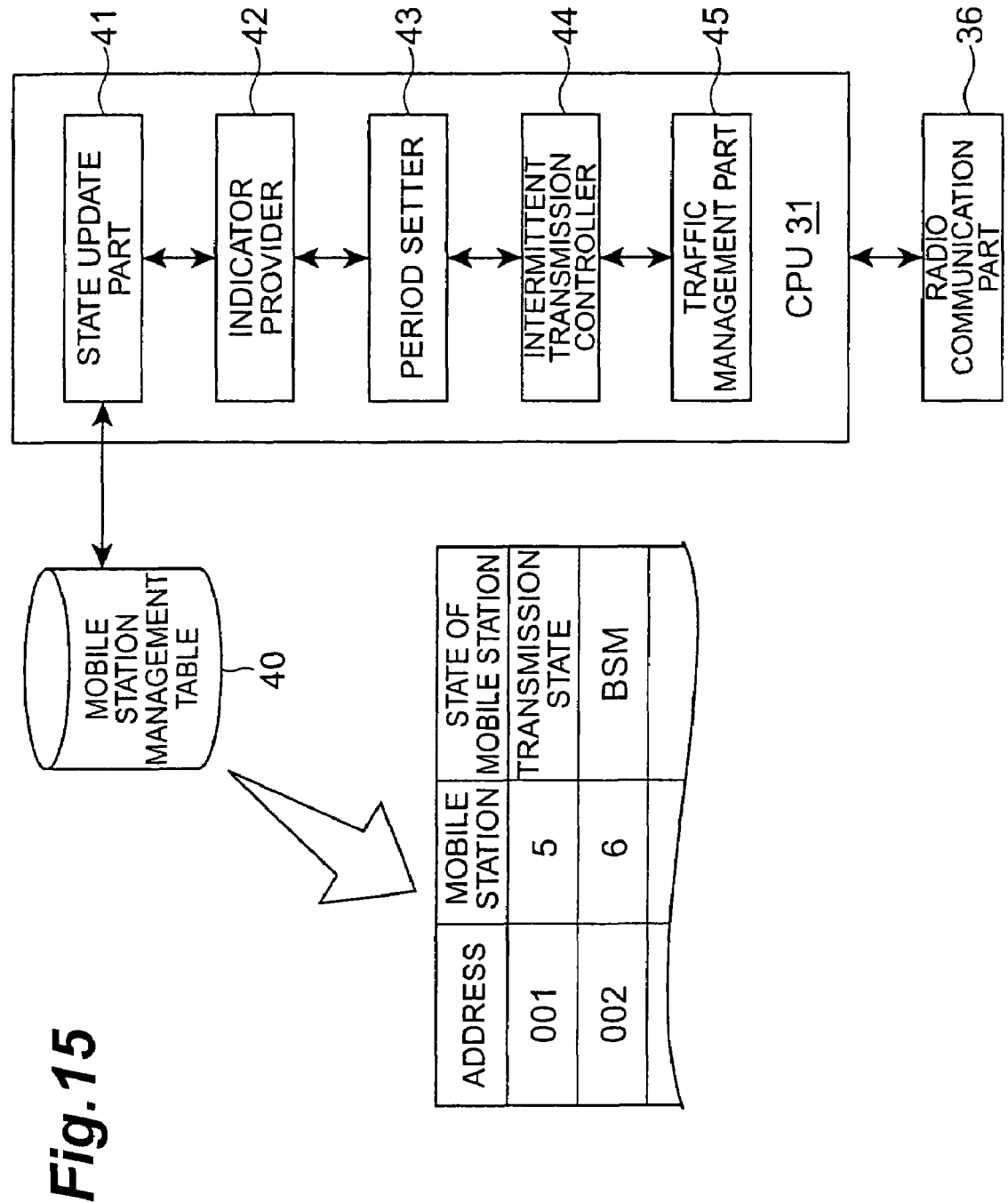
FIG. 15 is a block diagram showing each of means implemented by a CPU in another mobile station.

The base station 2 in the present embodiment is different from the base station 2 in the first embodiment in that the CPU 31 also operates as a traffic management part 45, as shown in FIG. 15. The details of the operation of this traffic management part 45 will be described later. A configuration of the control channel transmitted and received between the base station 2 and mobile station 5 is similar to that in the first embodiment.

(Operation Procedure between Base Station and Mobile Station)

Figure 12:
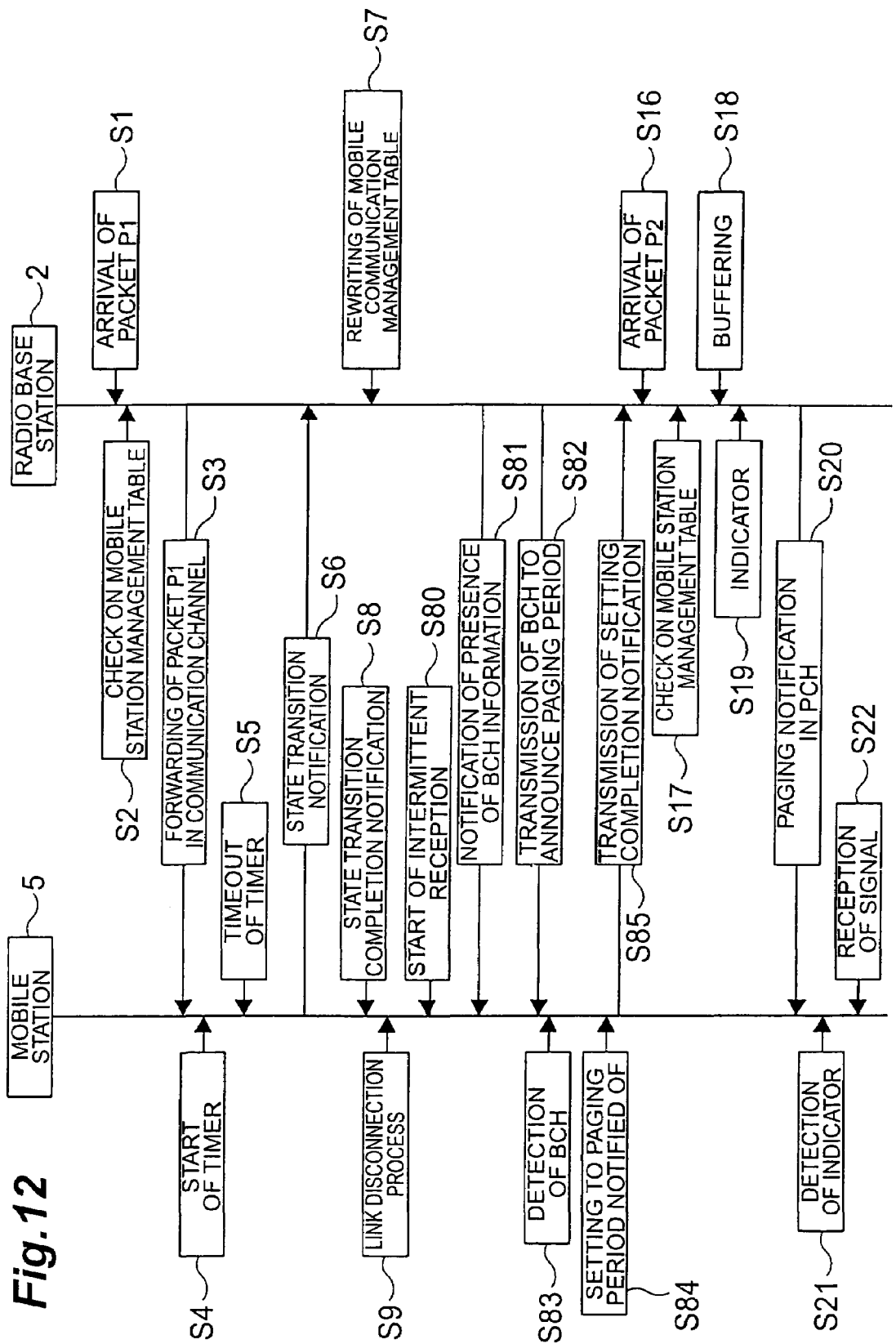
FIG. 12 is a chart showing another operation sequence carried out between a base station and a mobile station.

Next, an operation sequence between base station 2 and mobile station 5 in the mobile communication system 1 will be described. FIG. 12 is a chart showing the operation sequence carried out between base station 2 and mobile station 5.

First, the processes from the arrival of packet P1 at the base station 2 at step 1 to the disconnection process of the link by the mobile station 5 at step 9 are much the same as those in the first embodiment. Moving to step 80 subsequent to step 9, the mobile station 5 starts the intermittent reception of the paging channel. Then the flow goes to step 81, whereat in the base station 2 the CPU 31 operates as the traffic management part 45 to continuously or periodically measure a traffic pattern of packet in communication with the mobile station 5 through the radio communication part 36, and the period setting part 43 sets an appropriate paging period according to the result of the measurement. Furthermore, the indicator providing part 42 operates to set a flag indicating the necessity of reception, in the indicator 110a provided at the head of the broadcast channel 101. Subsequently, the flow goes to step 82, whereat the intermittent transmission control part 44 performs such a control as to transmit the broadcast channel 101 provided with the indicator 110a in accordance with the paging period set by the period setting part 43. This results in transmitting the broadcast channel 101 to announce the change of the paging period, to the mobile station 5.

Then the flow goes to step 83, whereat in the mobile station 5 the indicator detection part 64 operates to detect the indicator 110a and the broadcast channel analyzer 66 analyzes the detected indicator 110a to determine whether or not to receive the broadcast channel 101. Since the necessity of reception is set in the indicator 110a herein, the broadcast channel analyzer 66 determines that it is necessary to receive the broadcast channel, and the control channel reception control part 63 receives the broadcast channel 101. Then the flow goes to step 84, whereat the timing setting part 65 sets the changed paging period in accordance with the received broadcast channel 101 (which causes the mobile station 5 to dynamically change the paging period). Thereafter, the flow goes to step 85, whereat the CPU 51 instructs the radio communication part 55 to notify the base station 2 of completion of the setting of the paging period. Thereafter, the processes of step 16 to step 22 are carried out in the same procedure as in the first embodiment.

(Operation Procedure of Radio Base Station)

Figure 13:
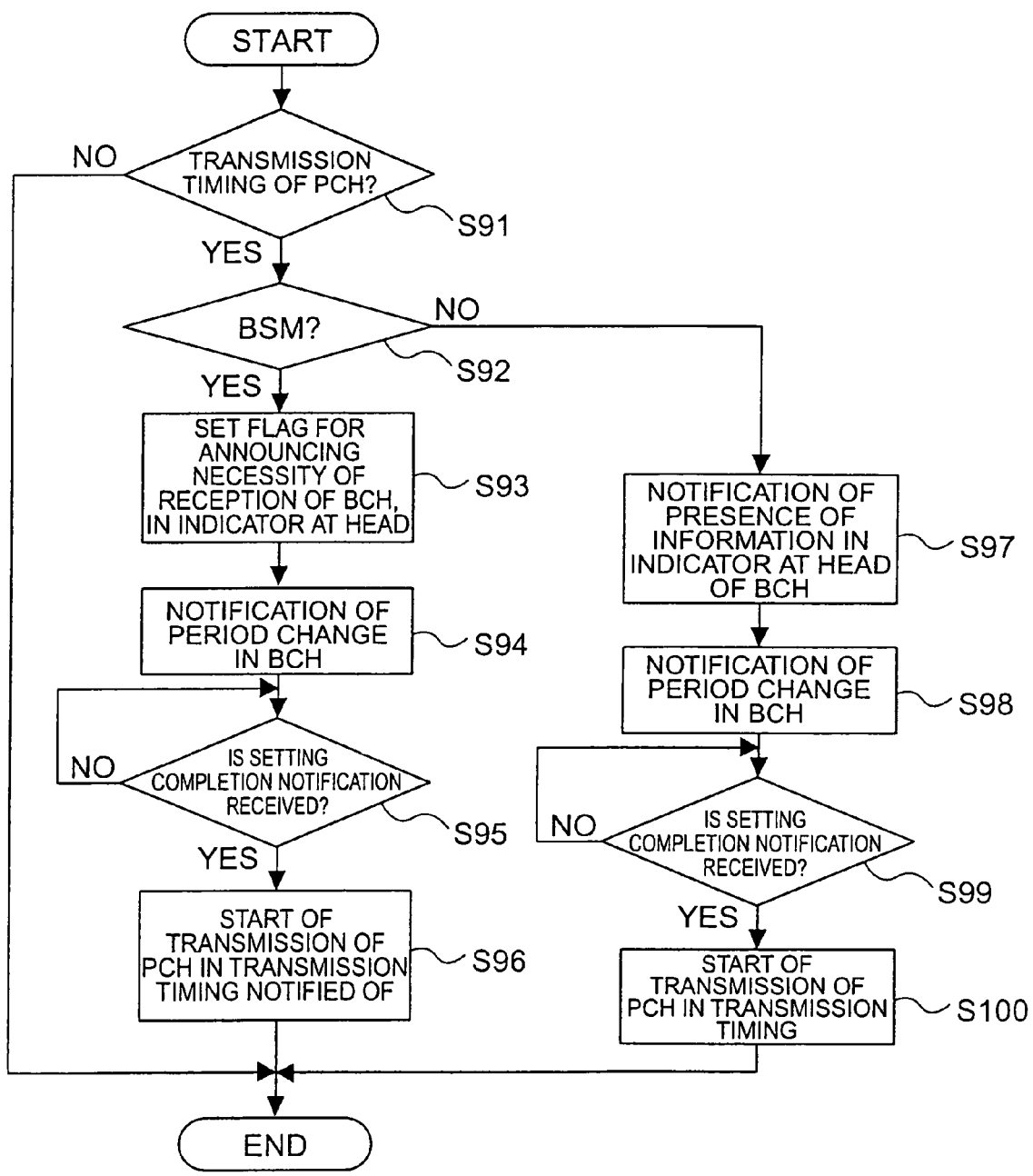
FIG. 13 is a flowchart showing the operation procedure at the radio base station in FIG. 12.

Next, the operation procedure of the radio base station in the aforementioned operation sequence will be described. FIG. 13 is a flowchart showing the operation procedure in the base station 2 different from that in the first embodiment.

In the base station 2 the CPU 31 executes the processing according to a program stored in the ROM 32. After the processing is started, the CPU moves to step 91, whereat the CPU 31 operates as the intermittent transmission control part 44 to determine whether it is the transmission timing of the paging channel. When it is the transmission timing of the paging channel, the CPU proceeds to step 92. When it is not the transmission timing, the processing is terminated. When moving to step 92, the intermittent transmission control part 44 determines whether it is the transmission timing of the battery saving mode (BSM). If it is the transmission timing of the battery saving mode, the CPU proceeds to step 93; otherwise, the CPU goes to step 97. When moving to step 93, the indicator providing part 42 operates to set a flag to announce the necessity of reception of the broadcast channel, in the indicator 110a provided at the head of the broadcast channel 101. The period setting part 43 sets the paging period after the change and puts information for announcing the change of the paging period, in the broadcast information. At subsequent step 94, the intermittent transmission control part 44 performs such a control as to transmit the broadcast channel 101 in accordance with the paging period set by the period setting part 43, thereby transmitting the broadcast channel 101. This results in notifying the mobile station of the change of the transmission timing (paging period) of the paging channel.

At step 95, the CPU 31 stands by before receiving a setting completion notification of the transmission timing from the mobile station 5 through the radio communication part 36. When receiving the notification, the CPU goes to step 96 to start the transmission of the paging channel 102 in the transmission timing (paging period) notified of at step 94.

On the other hand, when it is determined at step 92 that it is not the transmission timing of the battery saving mode, the CPU moves to step 97, whereat the indicator providing part 42 operates to set a flag for announcing the necessity of reception of the broadcast channel, in the indicator 110a provided at the head of the broadcast channel 100. The period setting part 43 sets the paging period after the change, and puts information for announcing the change of the paging period, in the broadcast information.

Then the CPU goes to step 98, whereat the intermittent transmission control part 44 performs such a control as to transmit the broadcast channel 101 in accordance with the paging period set by the period setting part 43, thereby transmitting the broadcast channel 101. This results in notifying the mobile station 5 of the paging period after the change. Then the CPU goes to step 99 to stand by before receiving a setting completion notification from the mobile station 5. When receiving the setting completion notification, the CPU goes to step 100 to start the transmission of the paging channel in the transmission timing (paging period) after the change, and then terminates the processing.

(Operation Procedure of Mobile Station)

Figure 14:
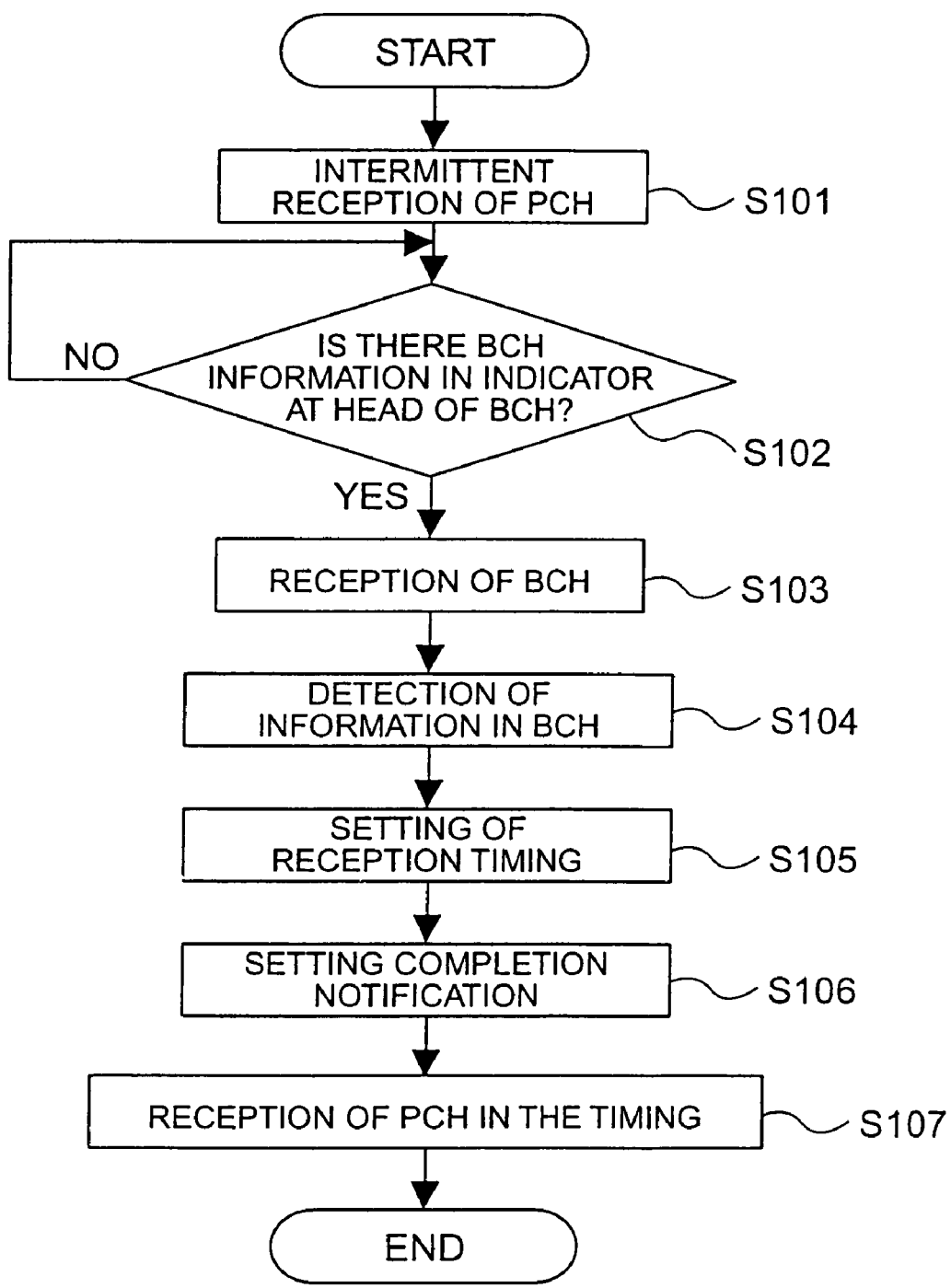
FIG. 14 is a flowchart showing the operation procedure at the mobile station in FIG. 12.

Next, the operation procedure of the mobile station in the aforementioned operation sequence will be described. FIG. 14 is a flowchart showing the operation procedure of the mobile station.

In the mobile station 5 the CPU 51 executes the processing in accordance with a program stored in the ROM 52. When the processing is started, the CPU goes to step 101, whereat the control channel reception control part 63 intermittently receives the paging channel in the transmission timing set according to the state and class of the host station. After the reception, the CPU goes to step 102, whereat the indicator detection part 64 detects the indicator 110 provided at the head of the broadcast channel 101 and the broadcast channel analyzer 66 analyzes the detected indicator 110 to determine whether or not to receive the broadcast channel 110. When it is determined that the reception is necessary, the CPU goes to step 103. When it is determined that the reception is not necessary, the CPU again executes step 102.

When moving to step 103, the control channel reception control part 63 then operates to receive the broadcast channel 101. At subsequent step 104, the CPU detects the paging period after the change from the received broadcast channel 101. Then the CPU goes to step 105, whereat the timing setting part 65 sets the reception timing of the paging channel in accordance with the paging period after the change. Then the CPU goes to step 106, whereat the CPU 51 notifies the base station 2 of completion of the setting of the paging period through the radio communication part 55. At subsequent step 107 the CPU receives the paging channel according to the control of the control channel reception control part 63. The above concludes the sequential processing.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system comprising a plurality of radio base stations, and a plurality of mobile stations configured to communicate with each of the radio base stations and segmented into a plurality of mobile station groups, wherein each of the radio base stations comprises means for providing a broadcast channel with first instruction information for notifying each mobile station of whether or not to receive the broadcast channel including a change announce of a paging period, means for providing a paging channel with second instruction information for notifying each mobile station of the presence/absence of paging information, and intermittent transmission control means for performing such a control as to intermittently transmit the broadcast channel provided with the first instruction information and the paging channel provided with the second instruction information on a control channel, and wherein each of the mobile stations comprises instruction information detecting means for detecting the first instruction information and the second instruction information transmitted on the control channel, broadcast channel analyzing means for analyzing the first instruction information detected by the instruction information detecting means and for determining whether or not to receive the broadcast channel, and paging channel reception control means for controlling whether or not to receive the paging channel, based on the second instruction information detected by the instruction information detecting means.

2. A mobile station forming a mobile communication system comprising a plurality of radio base stations, and a plurality of mobile stations configured to communicate with each of the radio base stations and segmented into a plurality of mobile station groups, the mobile station comprising:

instruction information detecting means for detecting first instruction information provided to a broadcast channel and second instruction information provided to a paging channel, the broadcast channel and the paging channel being transmitted on a control channel from a radio base station;

broadcast channel analyzing means for analyzing the first instruction information detected by the instruction information detecting means and for determining whether or not to receive the broadcast channel including a change announce of a paging period;

paging channel reception control means for controlling whether or not to receive the paging channel, based on the second instruction information detected by the instruction information detecting means; and timing setting means for setting a reception timing of the paging channel according to the broadcast channel, wherein the paging channel reception control means controls whether or not to receive the paging channel in the reception timing set by the timing setting means, and the timing setting means sets the reception timing according to whether the state of the mobile station is real time transmission mode, non real time transmission mode, and other different transmission mode.

3. The mobile station according to claim 2, further comprising state transition detecting means for detecting a state transition, wherein the radio base station is notified of the state transition detected by the state transition detecting means.

* * * * *